(12) United States Patent
Guilhem et al.

(10) Patent No.: US 6,194,035 B1
(45) Date of Patent: Feb. 27, 2001

(54) METHOD AND DEVICE FOR SURFACE SIZING OF SOFT PIECES WITH POROUS SURFACE

(76) Inventors: Christian Guilhem, Route Nationale 20, 82350 Albias; Jacques Guilhem, Le Rasclet, 82240 Puylaroque, both of (FR)

( * ) Notice: Subject to any disclaimer, the term of this patent is extended or adjusted under 35 U.S.C. 154(b) by 0 days.

(21) Appl. No.: 09/341,727

(22) PCT Filed: Jan. 30, 1998

(86) PCT No.: PCT/FR98/00171

§ 371 Date: Jul. 16, 1999

§ 102(e) Date: Jul. 16, 1999

(87) PCT Pub. No.: WO98/33602

PCT Pub. Date: Aug. 6, 1998

(30) Foreign Application Priority Data

Jan. 30, 1997 (FR) .................................................. 97 01190

(51) Int. Cl.[7] .................. B05D 1/02; B05D 3/02; B05D 3/06; B05D 3/04; B05D 5/10

(52) U.S. Cl. .................... 427/422; 427/421; 427/424; 427/314; 427/207.1; 427/372.2

(58) Field of Search ...................... 427/207.1, 208.6, 427/256, 314, 372.2, 421, 422, 424; 118/302, 324, 58

(56) References Cited

U.S. PATENT DOCUMENTS

| 4,224,355 | * | 9/1980 | Lampkin et al. | 427/8 |
|---|---|---|---|---|
| 4,721,252 | * | 1/1988 | Colton | 239/424.5 |
| 4,997,130 | * | 3/1991 | Weinstein | 239/222 |
| 5,130,173 | * | 7/1992 | Barten et al. | 427/314 |
| 5,478,014 | * | 12/1995 | Hynds | 239/135 |
| 5,531,833 | * | 7/1996 | Ogasawara et al. | 118/698 |
| 5,654,040 | * | 8/1997 | Matsunaga | 427/240 |

FOREIGN PATENT DOCUMENTS 34 19 867   9/1985   (DE) .

* cited by examiner

Primary Examiner—Shrive Beck
Assistant Examiner—Michael Barr
(74) Attorney, Agent, or Firm—Young & Thompson

(57) ABSTRACT

A method and a machine for surface sizing of soft pieces (3) with porous surface such as fabrics and foams, with liquid glue, includes preheating the surface of each piece (3) at a temperature higher than 50° C., then spraying the liquid glue by low pressure atomization on the pre-heated surface, thus preventing the glue from penetrating the thickness of the piece.

12 Claims, 3 Drawing Sheets

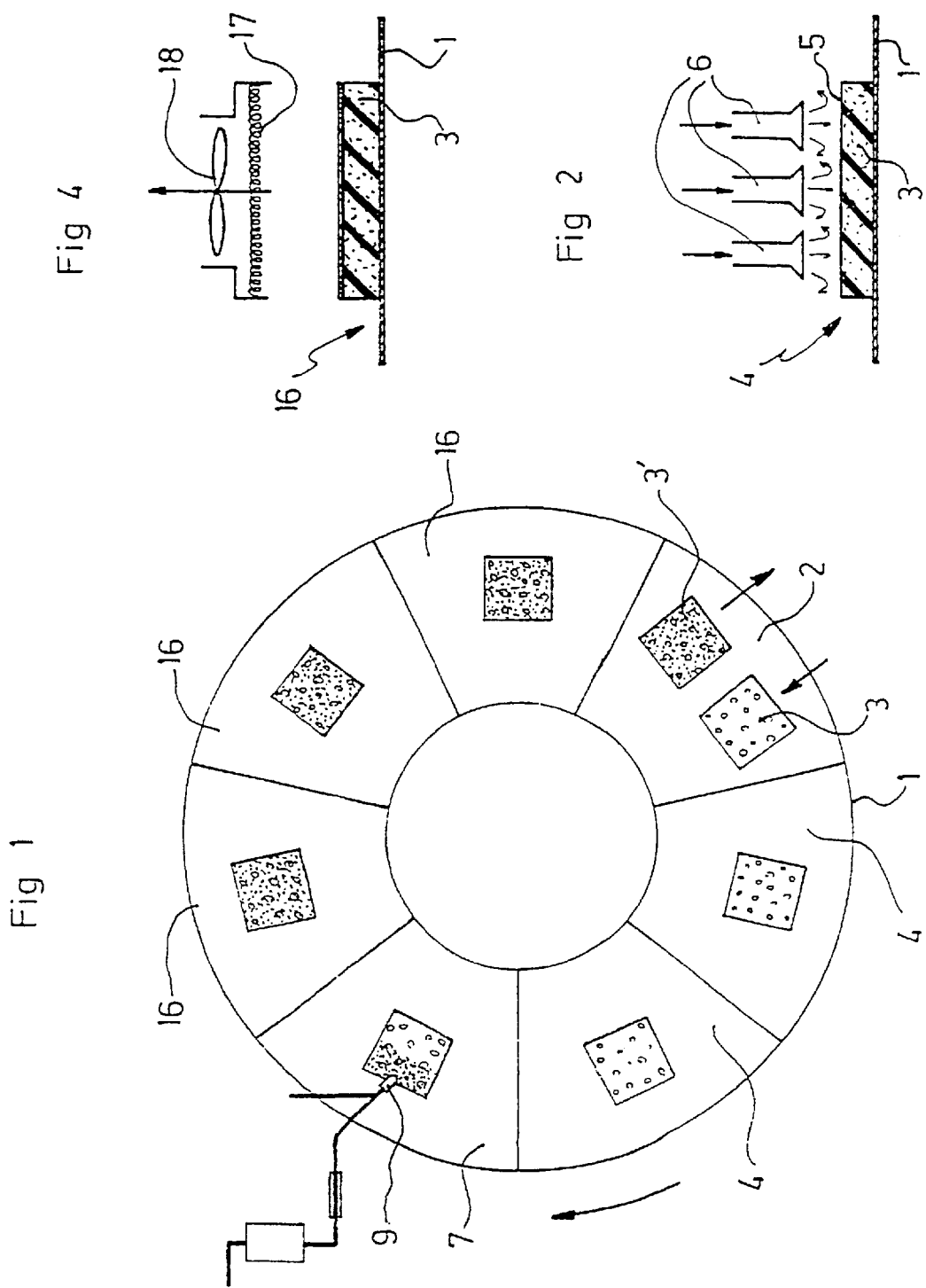

METHOD AND DEVICE FOR SURFACE SIZING OF SOFT PIECES WITH POROUS SURFACE

BACKGROUND OF THE INVENTION

The invention concerns a process and a machine for surface sizing flexible parts having a porous surface, such as fabric parts, foam parts etc, with a water-based adhesive.

At the present time, flexible parts made of fabric and/or foam are sized either with adhesives of the hot melt type or with adhesives in a volatile organic solvent of which the composition may be easily chosen in order to prevent any penetration of the adhesive into the thickness of the parts.

Indeed, when it is desired to size a flexible part having a porous surface, it is important to prevent, or in any case to minimize, penetration of the adhesive into the thickness of the part in order to prevent, on the one hand, a boarding effect (i.e. a hardening of the superficial thickness of the surface affecting its flexibility qualities) and, on the other hand, a waste of adhesive (only the adhesive deposited on the surface providing subsequent adhesion). Such is, for example and in particular, the case when seat covers and seat cushions are sized for their relative assembly by gluing.

Now, the volatile organic solvents used (acetone, toluene, methanol etc) are toxic and harmful to the environment and human health.

In addition, adhesives are known without a volatile organic solvent such as so-called "water-based adhesives". These water-based adhesives are adhesive compositions formed of a base of one or more synthetic or natural adhesives (polyurethanes, elastomers, thermoplastic polymers, acrylics, synthetic resins etc) dispersed in water. Nevertheless, these water-based adhesives have a much longer drying time and are difficult to transfer on account of their tendency to adhere to the walls of pipes, to precipitate and to form plugs. They are however fluid and tend inevitably to penetrate into the pores of the surfaces to which they are applied.

It should be noted that, in these water-based adhesives, unlike solvent-based adhesives, most of the dry solids which are proportionally much higher in quantity (of the order of 50%), are not dissolved but are in suspension, water only having the function of liquefying the composition and acting as a vehicle for the adhesive bases. As a consequence, the techniques used for sizing with solvent-based adhesives cannot be transposed to water-based adhesives.

So-called "two-component" water-based adhesives are also known, namely those associated with a second composition sprayed simultaneously and intended to accelerate the polymerization of the adhesive. However, this technique then requires the use of two costly application devices (two atomizing nozzles), which accordingly increases the risk of blockage as well as investment and running costs. This solution is therefore not compatible with continuous industrial production. Moreover, the said second composition based on ammonia or salts has a strong odor, is an irritant and attacks the skin and respiratory tracts.

In all cases, water inevitably penetrates into the pores, producing residual moisture which is harmful and undesirable in the part.

SUMMARY OF THE INVENTION

The object of the invention is therefore to overcome these drawbacks by providing a process and a machine enabling flexible parts with a porous surface, such as fabric parts, foam parts etc, to be surface sized with a water-based adhesive, by means of which the adhesive (and in particular the water which it contains) does not penetrate, or scarcely penetrates, the superficial thickness of the part, so that any boarding effect and any water retention are prevented, and this without the necessity for simultaneously applying a composition other than the adhesive itself.

The object of the invention is also to provide a process and a machine which can be used with various compositions and types of adhesive (with various adhesive bases, which can be reactivated or which are contact adhesives, etc) while preventing any precipitation, blocking or clogging phenomena in the equipment by the water-based adhesive.

The object of the invention is nevertheless also to provide a process and a machine more particularly and advantageously applicable to sizing with a water-based polyurethane and/or elastomer which can be heat-reactivated.

To this end, the invention concerns a process for surface sizing flexible parts having a porous surface such as fabric, foam etc with a water-based adhesive, wherein:

the surface to be sized of each part is preheated to a temperature above 50° C., the water-based adhesive is sprayed by atomization under low pressure onto the preheated surface.

Advantageously and according to the invention, the surface is preheated to the highest possible temperature that will not cause damage to the part, in particular by blowing hot air at a temperature of between 50° C. and 100° C.

According to the invention, as an adhesive agent for the water-based adhesive, it is possible to use in a general manner within the scope of the invention, one or more agents from among polyurethanes, synthetic or natural elastomers, acrylic thermoplastic polymers, resins etc, as long as the water-based adhesive is compatible with the material constituting the parts to be assembled and with the desired properties.

Advantageously and according to the invention, the water-based adhesive is warmed to a temperature of between 20° C. and 45° C. before spraying it by atomization. This temperature is also chosen in order to prevent any precipitation or blocking phenomena.

Similarly, advantageously and according to the invention, gas microbubbles are dispersed in the water-based adhesive, in particular by adding an effervescent agent compatible with the water-based adhesive, before it is sprayed by atomization.

The water-based adhesive is sprayed under low pressure, i.e. with a pressure just sufficient to enable it to be sprayed by atomization.

Advantageously and according to the invention, the water-based adhesive is sprayed by atomization under a relative pressure of between $0.2 \times 10^5$ Pa and $1 \times 10^5$ Pa.

Advantageously and according to the invention, the water-based adhesive is sprayed by atomization using contact with an air jet compressed to a low pressure, in particular between $0.2 \times 10^5$ Pa and $1 \times 10^5$ Pa (relative pressure)

Additionally, advantageously and according to the invention, the water-based adhesive is sprayed in a direction forming a non-zero angle $\alpha$ with the direction normal to the surface. The angle $\alpha$ is preferably between 30° and 60°, in particular of the order of 45°. In addition, advantageously and according to the invention, the water-based adhesive is sprayed with an atomizing nozzle which is held at a distance of between 5 cm and 50 cm, in particular of the order of 20 cm, from the surface.

Advantageously and according to the invention, the water-based adhesive is dried by radiant heating and/or by air extraction immediately after the water-based adhesive is sprayed.

The invention also concerns a machine for implementing a process according to the invention. The invention thus concerns a machine for surface sizing flexible parts with a porous surface such as fabric, foam etc, with a water-based adhesive, wherein it comprises:

- at least one unit for spraying the water-based adhesive by atomization under low pressure,
- and, upstream from each spray unit, at least one unit for preheating, in particular by hot air, the surface of the parts to a temperature above 50° C.

Advantageously and according to the invention, the spray unit includes means for spraying the adhesive by atomization under a relative pressure of between $0.2 \times 10^5$ Pa and $1 \times 10^5$ Pa, including in particular an atomizing gun connected to a pipe supplying adhesive under low pressure and to a pipe supplying air under low pressure.

In addition, advantageously and according to the invention, the machine includes means for holding a nozzle for spraying the adhesive directed at a non-zero angle $\alpha$ with respect to the direction normal to the surface of the part. Advantageously and according to the invention, the angle $\alpha$ is between 30° and 60°, in particular of the order of 45°, and the means are adapted so as to keep the angle $\alpha$ constant. In addition, advantageously and according to the invention, the machine includes means for holding a nozzle for atomizing the adhesive at a distance of between 5 cm and 50 cm, in particular of the order of 20 cm, from the surface of the part. Advantageously and according to the invention, the distance is constant.

In a machine according to the invention, the spray unit is adapted to spray the water-based adhesive by atomization in a cloud under low pressure forming on the surface a discontinuous layer, in particular in the general form of a spider's web. It should be noted in this respect, that the unit for spraying the water-based adhesive under low pressure in a discontinuous layer on the surface is different from a unit for spraying paint under high pressure in a uniform layer onto mechanical parts of motor vehicles (radiators) such as described in U.S. Pat. No. 5,130,173.

In addition, advantageously and according to the invention, the preheating unit includes means for blowing hot air onto the surface at a temperature of between 50° C. and 100° C.

In addition, advantageously and according to the invention, the machine includes means for warming the water-based adhesive to a temperature of between 20° C. and 45° C. before it is supplied to the spray unit. Advantageously and according to the invention, these means of heating comprise a heating device associated with an adhesive supply pipe of a spray gun.

Advantageously and according to the invention, the machine includes a conveyor adapted so as to convey parts successively opposite each unit of the machine and holding these parts opposite each unit for a predetermined period. Advantageously and according to the invention, the conveyor is adapted so that the dwell time of the parts opposite each unit is between 10 s and 20 s. In addition, the conveyor is also advantageously adapted so that the complete treatment of the parts is carried out in a total time less than or of the order of 2 min.

Advantageously and according to the invention, the machine is also characterized in that it includes an input unit receiving parts to be treated and an output unit at which the parts arrive after treatment, and in that the input unit and the output unit adjoin each other or are one and the same input/output unit, so that they can be controlled by one and the same automatic or human manipulator.

Tests demonstrate that the invention enables high quality sizing of the porous surfaces of flexible parts to be obtained with a water-based adhesive in an extremely easy manner, preserving the flexibility of the parts. In particular, it has been found that the simple fact of preheating the surface to be sized prevents any penetration of the water-based adhesive into the thickness of the porous material of the surface. The adhesive is deposited in a discontinuous layer similar to a spider's web, and not in a uniform layer.

It should be noted that the process and the machine according to the invention not only enable surface sizing to be carried out without any premature penetration of porous surface, but are in addition compatible with the requirements of the profitability of large-scale industrial production and consideration for the environment and human health. In particular, the water-based adhesive is non-toxic for personnel responsible for putting the invention into practice. In particular, the invention enables automatic sizing to be carried out in a total period of less than 2 min per part, with a single atomizing nozzle, without the pipes or nozzle being blocked, and enables a water-based adhesive to be used free from toxic solvent.

The invention can be advantageously applied to the assembly by gluing of fabric parts onto foam parts with which the adhesive agents of the water-based adhesives may be compatible (for example seat covers (even finished or closed) onto seat cushions).

The invention also concern a process and a machine comprising in combination all or part of the characteristics mentioned above or hereinafter.

BRIEF DESCRIPTION OF THE DRAWINGS

Other objectives, advantages and characteristics of the invention will become apparent in the light of the following description which refers to the accompanying figure in which:

FIG. 1 is a diagrammatic view from above illustrating a first embodiment of the different units of a machine according to the invention and different steps of a process according to the invention, FIG. 2 is a diagrammatic view in vertical section of an embodiment of a step and unit for preheating the porous surface of the flexible parts according to the invention, FIG. 4 is a diagrammatic view in vertical section of an embodiment of a step and unit for drying by radiant heat and air extraction according to the invention.

DESCRIPTION OF THE PREFERRED EMBODIMENTS

Figure 3:
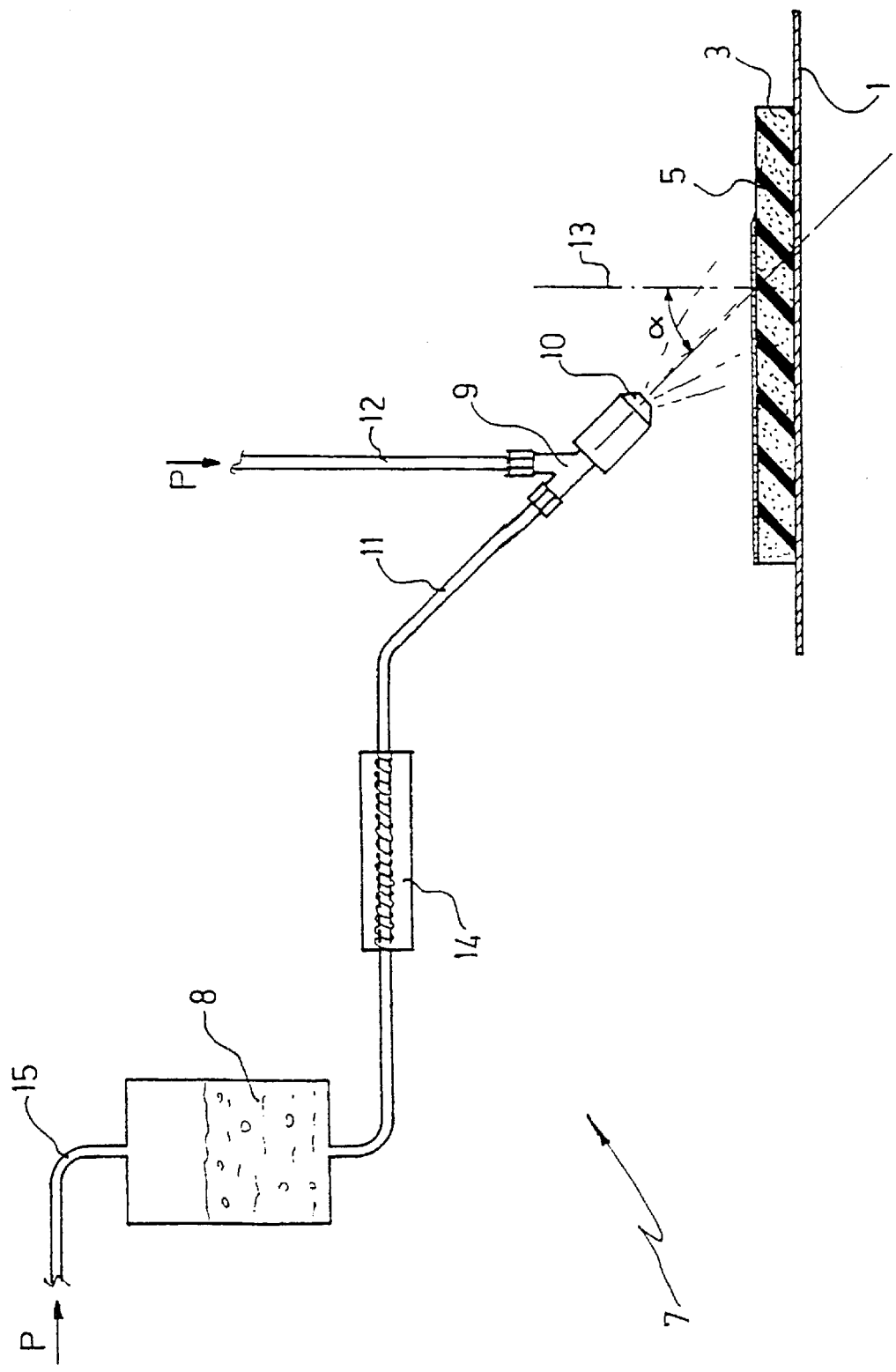
FIG. 3 is a diagrammatic enlarged view in elevation of an embodiment of a step and unit for spraying water-based adhesive according to the invention.

The machine represented in FIG. 1 includes a conveyor 1 forming a continuous loop.

In the first embodiment represented in FIG. 1, the conveyor 1 is a plate in the form of a circular ring, which can rotate in the direction indicated by the arrow.

This conveyor 1 is driven in rotation in a conventional manner by any suitable and known means, so as to convey the parts successively opposite each unit and to hold them opposite each unit for a predetermined period. The conveyor 1 is thus divided into sections with equal length of arc, each section forming one of the units of the machine on which a step of the process according to the invention is carried out. In the case of a circular conveyor, the sections are formed of identical angular sectors.

In the example represented in FIG. 1, the conveyor 1 defines seven identical sectors corresponding to seven successive units, from a first input/output sector 2 on which a new part 3 to be treated is placed and from which a part 3' is withdrawn which has undergone all the steps of the process. The supply of new parts 3 and the withdrawal of sized parts 3' may be carried out manually or by any suitable automatic device, for example a pneumatic manipulator with an articulated arm.

Immediately downstream from the input/output unit 2, the machine 1 includes at least one preheating unit 4 (in the example represented, two preheating units 4) for preheating the porous surface 5 of the parts 3 with hot air, at a temperature of between 50° C. and 100° C. As can be seen in FIG. 2, each preheating unit 4 may simply consist of an assembly of openings 6 for blowing hot air in the direction of the porous surface 5 from conventional means of the machine, not shown, for producing hot air. In a conventional manner, these means for producing hot air include means for regulating the temperature of the air blown through the openings 6, in particular to between 50° C. and 100° C.

Advantageously and according to the invention, this temperature is regulated so that it is as high as possible without it producing any damage to the part 3 during treatment. In general, this temperature will be less than 100° C., for example of the order of 90° C.

In any case, it has been found, by tests carried out, that when this temperature is above 50° C., penetration is prevented of the water-based adhesive inside the porous surface 5 of the parts 3.

Immediately downstream from the second preheating unit 4, the machine includes a unit 7 for spraying water-based adhesive by atomization under low pressure onto the previously heated porous surface 5. This spray unit 7 is represented diagrammatically in FIG. 3 and includes a reservoir 8 for water-based adhesive and an atomizing gun 9 provided with a nozzle 10 for atomizing the adhesive. The gun 9 is connected to a pipe 11 for supplying adhesive under pressure from the reservoir 8 and a pipe 12 for supplying air under pressure. The gun 9 is mounted in a conventional manner on a movable frame enabling the gun 9 to be moved opposite all the surface 5 to be sized. This frame moreover keeps the nozzle 10 at a constant distance from the surface 5 and is directed at an angle α which is constant but which may be adjusted as required with respect to the direction 13 normal to the surface 5 of the part 3.

This frame may be formed with a motorized automatic mechanism for guiding the gun along two horizontal axes, at a constant distance from the horizontal surface of the conveyor 1 receiving the parts 3. The gun 9 is mounted on this frame by means of an attachment incorporating means for angular adjustment in rotation about a horizontal axis, namely a pivoting connection which can be locked in any angular position.

Advantageously and according to the invention, this angle α lies between 30° and 60° and is more particularly of the order of 45°. In addition, the nozzle 10 is held at a distance from the surface 5 advantageously between 10 cm and 50 cm, more particularly of the order of 20 cm.

In addition, a heating device 14 is provided on the adhesive supply pipe 11, between the reservoir 8 and the gun 9, so that the water-based adhesive may be previously warmed, in particular to a temperature of between 20° C. and 45° C. before being fed to the gun 9. This heating device 14 may be formed of a simple electrical resistance surrounding a portion of the adhesive pipe 11, or of any other suitable known heating device, and includes means, preferably thermostatic, for adjusting the heating temperature.

It has been found that this preliminary heating of the water-based adhesive has the effect of reducing the risks of the nozzle 10 clogging, and assists in preventing penetration of adhesive and water inside the parts 3. The temperature is however chosen so as to prevent any precipitation or any setting of the water-based adhesive before it is sprayed.

The water-based adhesive is supplied under low pressure from the reservoir 8 into the gun 9. This low pressure may result in the water-based adhesive flowing simply under gravity from the reservoir 8 which is then placed in a raised position, as represented in FIG. 3, with respect to the gun 9 with the supply pipe 11 which emerges into the bottom of the reservoir 8. As a variant or in combination and preferably, the reservoir 8 is also pressurized by means of air under a low pressure P, introduced through the upper pressurizing pipe 15 emerging into the reservoir 8 above the level of the adhesive.

Similarly, the pipe 12 supplying the gun 9 with compressed air is connected to a source of compressed air under low pressure P. Advantageously, the pipes 12 and 15 are supplied from the same compressed air source (not shown) under low pressure, so that the water-based adhesive and the compressed air are provided to the gun 9 under the same pressure. This pressure is for example between (in relative values) $0.2 \times 10^5$ Pa and $1 \times 10^5$ Pa, in particular of the order of $0.5 \times 10^5$ Pa.

In addition, advantageously, before spraying, a dispersion of gas microbubbles is produced in the water-based adhesive, in particular by adding an effervescent agent to the water-based adhesive in the reservoir 8. This effervescent agent and the gas which it liberates, and more generally the gas microbubbles, must be compatible with the adhesive base of the water-based adhesive and must not interfere with its adhesive properties.

In order to produce this dispersion, the gas microbubbles may also (as a variant or in combination) be directly introduced into the very centre of the water-based adhesive in the reservoir 8 (direct blowing of air bubbles from a manifold provided with a plurality of blowing orifices, electrolysis, etc).

Accordingly, the water-based adhesive is sprayed by atomization in a cloud under a low pressure on the previously heated porous surface 5.

Immediately downstream from the spray unit 7, the machine includes one or more units for drying the water-based adhesive by radiant heating and/or air extraction. An example of the unit 16 for drying by radiant heat and air extraction is represented diagrammatically in FIG. 4. This unit 16 includes an infrared radiant heating bank 17 positioned above the sized surface 5 and a fan 18 for extracting moist air coming from this surface 5 during drying. This unit 16 thus enables the adhesive to be dried by evaporation of water.

In the example represented in FIG. 1, the conveyor 1 defines three drying units 16 downstream from the spray unit 7. The last drying unit 16 is identical to the first two if it is desired to use the treated parts 3' obtained leaving in the hot state (in particular for immediate assembly with other parts). If, on the contrary, the treated parts 3' are intended to be stored, the last drying unit includes only an extraction fan 18 without the heating device 17.

The conveyor 1 is held stationary for a predetermined time T1 corresponding to the dwell time of the parts 3 opposite each unit 2, 4, 7, 16. At the end of this period T1, the conveyor 1 is driven in angular rotation with an amplitude corresponding to a sector defining a unit 2, 4, 7, 16. These operations are repeated periodically and successively so as to enable each part 3 to be conveyed to and held opposite each of the units of the machine.

The period T1 corresponding to the dwell time of the parts 3 opposite each unit must enable the parts 3, 3' to be supplied and withdrawn at the input/output unit 2, and the water-based adhesive to be sprayed over all the porous surface 5 by the gun 9 of the spray unit 7. Advantageously, this period T1 is between 10 s and 20 s, the complete treatment of the parts being made within a total period less than or of the order of 2 min. For example, this period T1 is 15 s, in the embodiment of FIG. 1, each part 3 is preheated for 30 s and then dried after spraying for 45 s, so that the treatment is carried out in 1 min 45 s.

It should also be noted that several parts 3 may be treated simultaneously on each unit. For example, it is possible to place side by side a piece of foam and a fabric seat cover intended to be assembled together immediately on leaving the machine according to the invention.

According to the initial water content of the water-based adhesive and the duration of drying after spraying (and hence the quantity of water evaporated) a heat-reactivatable adhesive is obtained (for a final water content below 5%) or a self adhesive contact adhesive (for a final water content of the order of 20%)

Figure 5:
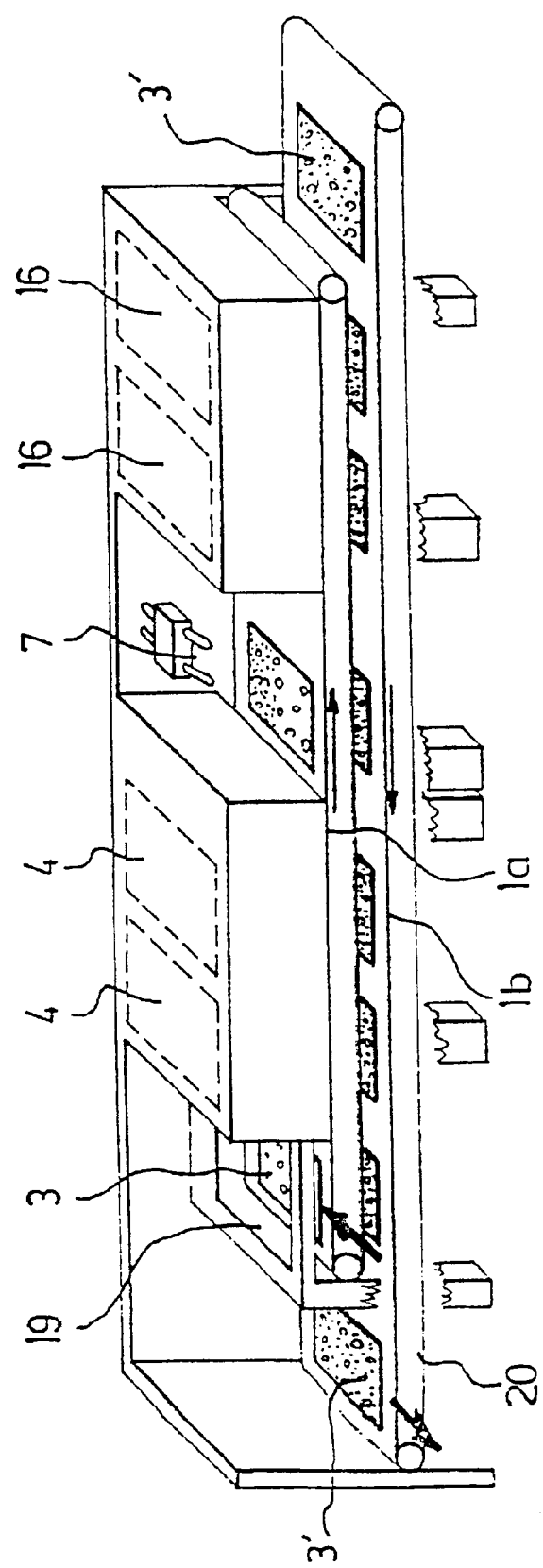
FIG. 5 is a diagrammatic partially cut-away perspective view illustrating a second embodiment of a machine and process according to the invention.

FIG. 5 represents a second embodiment of a machine according to the invention in which the conveyor is formed of two conveyor belts 1a, 1b, of which an upper conveyor belt 1a which moves successively opposite an input unit 19, two preheating units 4 of the surface of the parts, a unit 7 for spraying adhesive by atomization, and two drying units 16. A lower belt 1b extends axially beyond the end of the upper belt 1a, so that the lower belt 1b collects the treated parts 3' downstream from the last drying unit 16 and brings them back by a return route to an output unit 20 which is adjacent to the input unit 19. The upper belt thus moves in the reverse direction to the lower belt 1b. Since the input and output units 19 and 20 are close to each other they may be controlled by a single person. The parts 3' may be stored and stacked at the exit from the output unit 20.

In this second embodiment, the conveyor thus defines a linear path (not circular). It should be noted that it is also possible to provide a non-return conveyor for example if the sized parts 3' are directly assembled. In this case, the machine only includes the upper belt 1a.

Tests carried out have demonstrated that it is possible to spray a water-based adhesive by atomization onto foam or fabric parts (or more generally those made of a textile material) without this adhesive penetrating into the core of the porous material, any boarding effect being prevented.

It was possible, in particular, to glue foam cushions and textile seat covers which were then assembled to form seats and which retained all their flexibility.

EXAMPLE

The seats of office chairs were sized made of a flexible foam, reference 27M, PLASCO (FRANCE) having the following characteristics:

net density: 25 kg/m$^3$, load bearing capacity: 2.7 kPa, indentation hardness: 93 N at 25%; 120 N at 40%; 225 N at 65%, elongation: 224%, resilience: 57%, and seat cover made of 100% CLEVYL fabric 2 mm thick and with a mass per unit area of 309 g/m$^2$.

A water-based adhesive was used reference GREEN GLUE, from the CHIMISTRA (FRANCE) company, which was warmed to 30° C.

The parts were preheated with air to 80° C.

The spraying device shown in FIG. 3 was used with a 10 l adhesive reservoir 8 pressurized to $0.5 \times 10^5$ Pa. The pressure of the compressed air supplied for atomization was also $0.5 \times 10^5$ Pa. The spraying angle was 45° and the atomizing nozzle 10 was held at around 13 cm from the surface to be glued.

After drying for 1 min under a drying unit 16, the sized parts were perfectly dry and could be stacked since they did not adhere to each other. The seats and seat covers remained perfectly flexible, the adhesive not having penetrated into the thickness, and were free from moisture.

They could be stored for several days before assembly by heat-reactivating the water-based adhesive deposited on the surface. It was thus found that the invention made it possible to apply a suitable quantity of adhesive in order to obtain effective gluing, without a boarding effect, in a discontinuous layer having a generally thread-like or spider's web form.

The invention may be the object of different variants in relation to the embodiments described and represented. In particular, various formulations may be used. Moreover, it is possible to provide several spray units in series or in parallel and, on each spray unit, several atomizing guns operating simultaneously. Equally, the number of preheating and subsequent drying units may be different as well as the form of the conveyor 1. Otherwise, the machine is equipped with traditional control and spray devices, in particular a peripheral casing enclosing the conveyor 1.

What is claimed is:

1. A process for surface sizing flexible parts (3) having a porous surface (5) with a water-based adhesive, comprising the steps of:

preheating the surface (5) to be sized of each part (3) to a temperature above 50° C., spraying the adhesive by atomization under low pressure onto said preheated surface (5).

2. The process as claimed in claim 1, wherein said surface (5) is preheated to the highest possible temperature that will not visibly deform the part (3).

3. The process as claimed in claim 1, wherein said surface (5) is preheated by blowing hot air at a temperature between 50° C. and 100° C.

4. The process as claimed in claim 1, wherein the water-based adhesive is warmed to a temperature of between 20° C. and 45° C. before it is sprayed by atomization onto said surface (5).

5. The process as claimed in claim 1, wherein gas bubbles are dispersed in the water-based adhesive before it is sprayed by atomization.

6. The process as claimed in claim 1, wherein the water-based adhesive is sprayed by atomization under a pressure of between $0.2 \times 10^5$ Pa and $1 \times 10^5$ Pa.

7. The method as claimed in claim 1, wherein the water-based adhesive is sprayed by atomization using contact with an air jet compressed to a low pressure.

8. The process as claimed in claim 7, wherein a jet of air is used compressed to a pressure of between $0.2 \times 10^5$ Pa and $1 \times 10^5$ Pa.

9. The process as claimed in claim 1, wherein the water-based adhesive is sprayed in a direction forming a non-zero angle ($\alpha$) with the direction (13) normal to said surface (5).

10. The process as claimed in claim 9, wherein the water-based adhesive is sprayed at an angle ($\alpha$) of between 30° and 60°.

11. The process as claimed in claim 1, wherein the water-based adhesive is sprayed with the aid of an atomizing nozzle (10) which is held at a distance of between 5 cm and 50 cm from the said surface (5).

12. The process as claimed in claim 1, wherein the water-based adhesive is dried by radiant heating and/or by air extraction after spraying the water-based adhesive.

* * * * *